(12) United States Patent
Tonet

(10) Patent No.: US 11,016,465 B2
(45) Date of Patent: May 25, 2021

(54) ELECTRICAL POWER SUPPLY SYSTEM FOR A PROGRAMMABLE LOGIC CONTROLLER

(71) Applicant: SCHNEIDER ELECTRIC INDUSTRIES SAS, Rueil Malmaison (FR)

(72) Inventor: Richard Tonet, Le Rouret (FR)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 165 days.

(21) Appl. No.: 15/573,888

(22) PCT Filed: Jun. 2, 2016

(86) PCT No.: PCT/EP2016/062542
§ 371 (c)(1),
(2) Date: Nov. 14, 2017

(87) PCT Pub. No.: WO2016/202603
PCT Pub. Date: Dec. 22, 2016

(65) Prior Publication Data
US 2018/0292801 A1 Oct. 11, 2018

(30) Foreign Application Priority Data
Jun. 17, 2015 (FR) ..................... 1555533

(51) Int. Cl.
*G05B 19/05* (2006.01)
(52) U.S. Cl.
CPC .. *G05B 19/058* (2013.01); *G05B 2219/15089* (2013.01)
(58) Field of Classification Search
CPC ........ G05B 19/058; G05B 2219/15089; G05F 1/30
See application file for complete search history.

(56) References Cited

U.S. PATENT DOCUMENTS 5,550,444 A * 8/1996 Zeller ................ H02J 3/30
318/139
5,761,529 A * 6/1998 Raji ................ H04M 11/10
710/4

(Continued)

FOREIGN PATENT DOCUMENTS

CN 104035324 A 9/2014

OTHER PUBLICATIONS

International Search Report dated Aug. 19, 2016 in PCT/EP2016/062542 filed Jun. 2, 2016.

*Primary Examiner* — Thienvu V Tran
*Assistant Examiner* — Peter M Novak
(74) *Attorney, Agent, or Firm* — Oblon, McClelland, Maier & Neustadt, L.L.P.

(57) ABSTRACT

An electrical power supply system for a programmable logic controller, including: a first electrical power supply module configured to operate in a master mode to deliver at least one electrical supply voltage to the programmable logic controller; a second electrical power supply module configured to operate in a slave mode to deliver the electrical supply voltage to the programmable logic controller in event of failure of the first electrical power supply module; a control module configured to temporarily control switching of the first electrical power supply module to the slave mode and switching of the second electrical power supply module to the master mode; and a test module configured to test the second electrical power supply module when the second electrical power supply module is switched to the master mode.

10 Claims, 2 Drawing Sheets

(56) References Cited

U.S. PATENT DOCUMENTS

| | | | |
|---|---|---|---|
| 5,812,882 A | 9/1998 | Raji et al. | |
| 5,845,150 A | 12/1998 | Henion | |
| 8,046,648 B1* | 10/2011 | Russell | G01R 31/31701 |
| | | | 714/724 |
| 2006/0237705 A1* | 10/2006 | Kuo | G06F 13/4269 |
| | | | 257/1 |
| 2009/0158070 A1* | 6/2009 | Gruendler | G06F 11/2015 |
| | | | 713/340 |
| 2012/0019193 A1* | 1/2012 | Yu | G06F 1/266 |
| | | | 320/103 |
| 2013/0138365 A1* | 5/2013 | Etaati | H02J 9/06 |
| | | | 702/58 |
| 2014/0310539 A1* | 10/2014 | Messick | G06F 1/263 |
| | | | 713/320 |
| 2016/0241039 A1* | 8/2016 | Cheng | H02J 3/383 |

* cited by examiner

ELECTRICAL POWER SUPPLY SYSTEM FOR A PROGRAMMABLE LOGIC CONTROLLER

TECHNICAL FIELD OF THE INVENTION

The present invention relates to an electrical power supply system for a programmable logic controller. The particularity of the electrical power supply system is that it includes two electrical power supply modules for redundancy.

PRIOR ART

In a safety-related application, it is necessary to safeguard the electrical power supply of the programmable logic controller tasked with controlling the safety-related application. In order to achieve this, two electrical power supply modules are often employed for redundancy, one main electrical power supply module, configured to operate as the master module, and a backup electrical power supply module, configured to operate as the slave module. In this way, in the event of failure of the main electrical power supply module, the backup electrical power supply module is tasked with taking over. In this type of architecture, it is common for both electrical power supply modules to share the task of supplying the current. Despite the aforementioned, the backup electrical power supply module still ages. Thus, when the main electrical power supply module fails, nothing guarantees that the backup electrical power supply module is capable of taking over.

Document US2009/158070A1 describes a solution of redundancy between multiple power supply modules. The proposed solution consists in determining the redundancy operating mode of the system by measuring the input voltage available at the input of each module.

The object of the invention is to propose an electrical power supply system comprising a first electrical power supply module configured to operate in master mode and a second electrical power supply module configured to operate in slave mode and which makes it possible to guarantee the supply of power to the programmable logic controller under all circumstances.

SUMMARY OF THE INVENTION

This object is achieved by an electrical power supply system for a programmable logic controller, comprising:
- a first electrical power supply module configured to operate in a master mode in order to deliver at least one electrical supply voltage to the programmable logic controller;
- a second electrical power supply module configured to operate in a slave mode in order to deliver said electrical supply voltage to the programmable logic controller in the event of failure of the first electrical power supply module;
characterized in that it includes:
- a control module arranged to temporarily control the switching of the first electrical power supply module to slave mode and the switching of the second electrical power supply module to master mode;
- a test module arranged to test the second electrical power supply module in current when the latter is switched to master mode.

In the solution described in document US2009/158070A1, it simply amounts to determining the redundancy operating mode of the power supply system. The proposed solution does not make it possible to guarantee that each slave module remains capable of becoming the master module when required.

According to one particularity, the test module includes:
- a measurement module arranged to measure the electric current delivered by the second electrical power supply module when the latter is in master mode;
- a comparison module for comparing the measured electric current with a minimum threshold value required to supply power to the programmable logic controller.

According to one particularity, the test module is incorporated within the second electrical power supply module.

According to another particularity, the test module is started up cyclically by the second electrical power supply module.

According to another particularity, the test module of the second electrical power supply module includes a measurement module for measuring the voltage delivered by the module and a comparison module for comparing said measured voltage with at least one threshold value.

According to another particularity, the threshold value is determined according to whether the module is in the master or slave operating mode.

According to another particularity, the first electrical power supply module includes a test module comprising a measurement module for measuring the voltage delivered by the module and a comparison module for comparing said measured voltage with at least one threshold value. The threshold value is determined according to whether the module is in the master or slave operating mode.

BRIEF DESCRIPTION OF THE FIGURES

Other features and advantages will appear in the following detailed description given with regard to the appended drawings, in which.

DETAILED DESCRIPTION OF AT LEAST ONE EMBODIMENT

The electrical power supply system of the invention is intended to supply electrical power to a programmable logic controller.

In a known manner, a programmable logic controller includes, for example, multiple modules connected to one another via a backplane bus 3. The programmable logic controller includes in particular a central unit module 4 and multiple input/output modules 5. In order to operate, the programmable logic controller includes an electrical power supply system delivering at least one electrical supply voltage to all of the modules. The electrical supply voltage is applied to the backplane bus 3 by the electrical power supply system.

Figure 1:
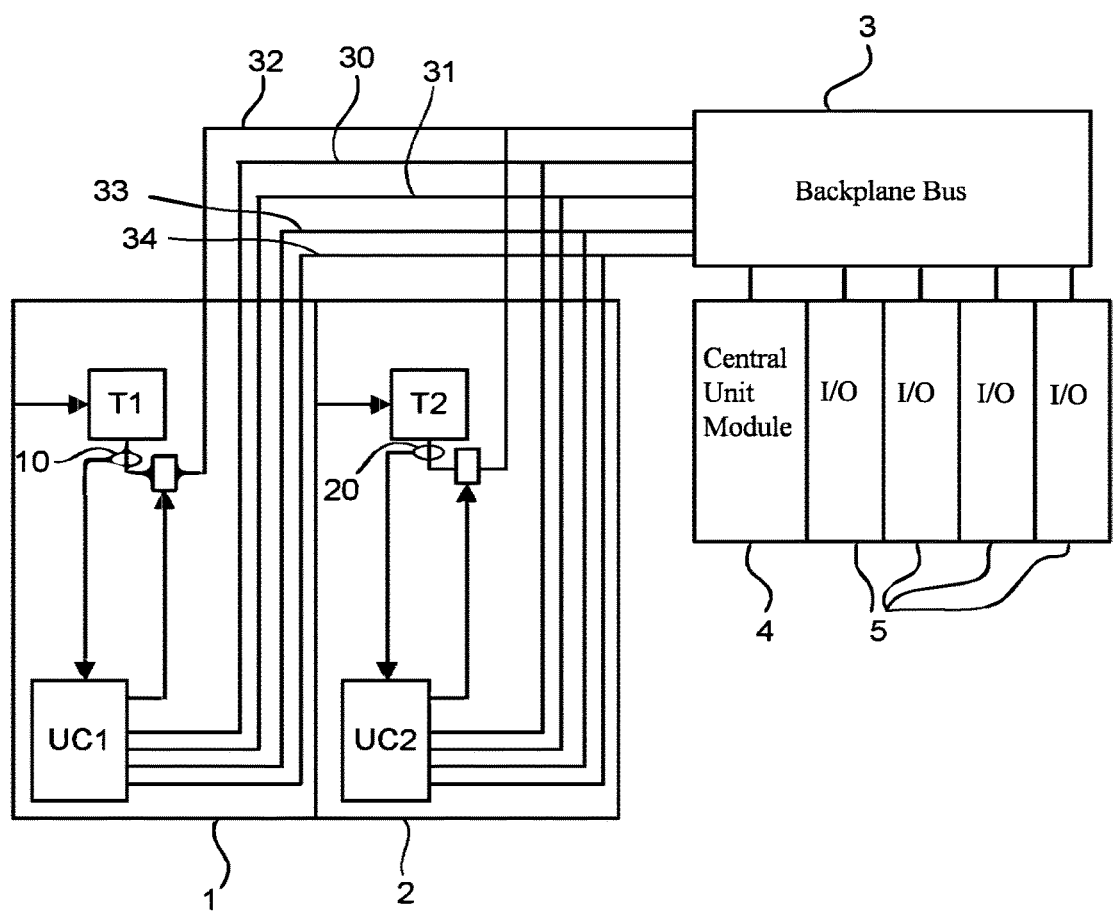
FIG. 1 shows the architecture of the electrical power supply system of the invention.

With reference to FIG. 1, the electrical power supply system of the invention includes a first electrical power supply module 1 and a second electrical power supply module 2. The two modules 1, 2 are associated for redundancy so as always to deliver at least one electrical voltage required to supply electrical power to the programmable logic controller.

The modules 1, 2, 4, 5 of the controller are for example all connected to the backplane bus 3 via a connector through which the electrical power supplies and data exchanged between the modules pass. Through the bus, the modules communicate with one another by virtue of a communication protocol, for example the I2C (Inter-Integrated Circuit) protocol.

The first electrical power supply module 1 and the second electrical power supply module 2 each include a microcontroller, referred to as the first microcontroller UC1 and the second microcontroller UC2, respectively. Each microcontroller includes a communication module arranged to send/receive messages through the bus 3 using the chosen communication protocol.

In the appended FIG. 1, the backplane bus 3 includes in particular:
- two lines 30, 31 intended for communication between the two microcontrollers of the modules (I2C bus);
- one electrical power supply line 32 to which the two modules apply a voltage in order to supply power to the modules of the programmable logic controller;
- one line 33 over which each microcontroller of the system may transmit a signal to the central unit module in order to inform that it is no longer capable of providing redundancy of the power supply;
- one line 34 over which each microcontroller of the system informs the central unit module and the other modules of the programmable logic controller that they are capable of delivering the required voltages.

In the electrical power supply system of the invention, one of the modules is configured to operate in master mode (M) and the other is configured to operate in slave mode (S). The two modules deliver the voltage but, unlike certain prior solutions, only the module that is in master mode monitors the current delivered for supplying power to the programmable logic controller.

The master mode and the slave mode can be configured on each module based on hardware. The configuration in master mode or in slave mode is determined by a value A, equal to 1 or 0, taken by a bit read by the microcontroller of each module. When the bit A takes the value 0, the module is in master mode and when the bit A takes the value 1, the module is in slave mode.

The first electrical power supply module 1 includes a power supply input intended to be connected to the electrical network and receiving a supply voltage from this network. A transformer T1 present in the module makes it possible to convert the voltage from the network into one or more voltages for supplying electrical power to the programmable logic controller and potentially to sensors or actuators connected to the input/output modules of the controller.

The first electrical power supply module 1 includes measurement means for measuring the voltages delivered by the module and the currents 10 generated by the electrical power supply module for each voltage applied by the module. These measurement means include in particular a software-based measurement module present in the first microcontroller that receives analogue voltage and current measurement data.

The first microcontroller includes a test module for testing the voltages and currents delivered by the module. The test module includes in particular a first comparison module arranged to verify that each voltage is comprised between a lower threshold value and an upper threshold value and hence conforms to the master or slave operating mode of the module. The upper and lower threshold values are defined and distinct for each of the master and slave operating modes of the module.

The test module includes a second comparison module arranged to verify that each current delivered for each applied voltage is higher than a predetermined threshold value, said threshold value being defined as sufficient for the operation of the components supplied with power when the module is in master mode.

The first microcontroller UC1 includes a control module arranged to send a control signal with a view to applying a voltage to the bus 3, corresponding to the master or slave mode in which the module is configured.

The second electrical power supply module 2 includes a power supply input intended to be connected to the electrical network and receiving a supply voltage from this network. A transformer T2 present in the module makes it possible to convert the voltage from the network into one or more voltages for supplying electrical power to the programmable logic controller and potentially to sensors or actuators connected to the input/output modules of the controller.

The second electrical power supply module 2 includes measurement means for measuring the voltages delivered by the module and the currents 20 generated by the electrical power supply module for each voltage applied by the module. These measurement means include in particular a software-based measurement module present in the microcontroller that receives analogue voltage and current measurement data. The second microcontroller UC2 includes a test module for testing the voltages and currents delivered by the module. The test module includes in particular a first comparison module arranged to verify that each voltage is comprised between a lower threshold value and an upper threshold value and hence conforms to the master or slave operating mode of the module. The test module includes a second comparison module arranged to verify that each current delivered for each applied voltage is higher than a predetermined threshold value, said threshold value being defined as sufficient for the operation of the components supplied with power when the module is in master mode.

The second microcontroller UC2 includes a control module arranged to send a control signal with a view to applying a voltage to the bus 3, corresponding to the master or slave mode in which the module is configured.

When an electrical power supply module is configured to operate in master mode, it is capable of delivering a voltage referred to as the high voltage (H) and when it is configured to operate in slave mode, it is capable of delivering a voltage referred to as the low voltage (L). Throughout the rest of the description and in the figures, it will be considered that each module is capable of delivering two voltages 24 V and 3.3 V, broken down into 24 V H, 24 V L and 3.3 V H, 3.3 V L.

The two microcontrollers UC1, UC2 are in particular arranged to communicate with one another and to control the implementation of a temporary test of the electrical power supply module configured to operate in slave mode. The test may be started up periodically or at the discretion of the two modules. In general, the test consists in switching the second electrical power supply module to master mode and the first electrical power supply module to slave mode then in measuring the current delivered by the second module and in comparing it with that measured previously for the first module. If the values are equivalent, this means that the second module is still operational and ready to take over from the first module in the event of failure of the latter. Once the test has been completed, each electrical power supply module returns to its initial configuration, i.e. the first module returns to master mode and the second module returns to slave mode.

Figure 2:
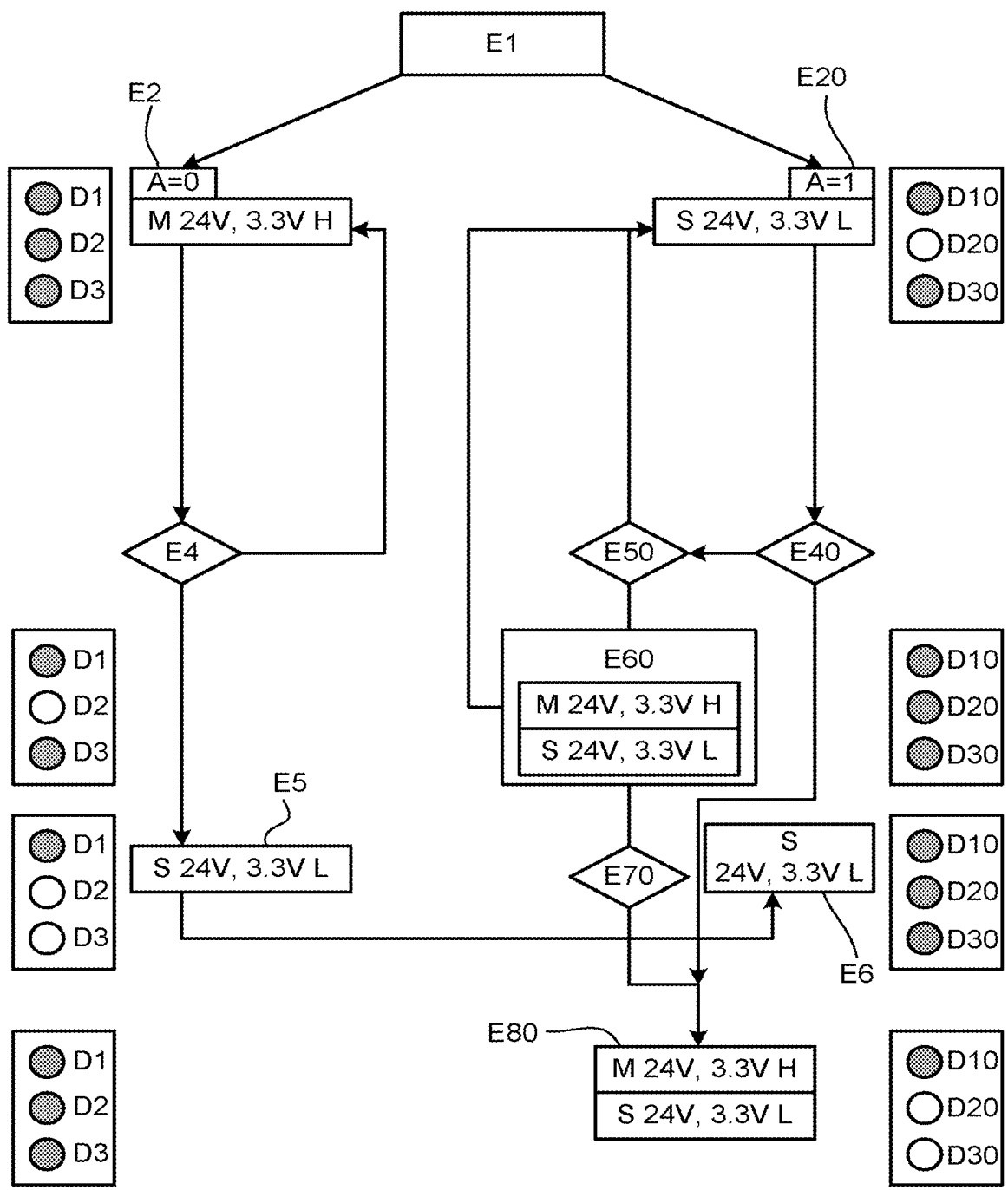
FIG. 2 illustrates the control method implemented in the electrical power supply system of the invention.

More precisely, the algorithm implemented is shown in FIG. 2. Each module includes for example three indicator lights, for example light-emitting diodes, that are intended to provide information on various operating states. For the two modules, a first light D1, D10 is illuminated in order to indicate that the module is operating correctly. A second light D2, D20 is illuminated in order to indicate that the module is in master mode. If it is off, this means that the module is in slave mode. A third light D3, D30 is intended to indicate the state of redundancy. If this light is off, this means that the module is faulty and is therefore not able to operate for redundancy.

Based on these various elements, the algorithm implemented is as follows:

E1: The first step consists in powering up the electrical power supply system.

E2 and E20: The first electrical power supply module 1 is configured to operate in master mode (A=0) and the second electrical power supply module 2 is configured to operate in slave mode (A=1). The first electrical power supply module 1 is then capable of delivering the voltages 24 V H and 3.3 V H and the second electrical power supply module 2 is then capable of delivering the voltages 24 V L and 3.3 V L. The light D2 is illuminated for the first module 1 and the light D20 is off for the second module 2.

E4: The first microcontroller UC1 of the first module 1, configured to operate in master mode, starts up its test module so as to verify that the voltages and currents delivered by the module are indeed comprised between the defined threshold values for the master mode. If everything is in order, the first module 1 remains in the same configuration. This test module is started up cyclically by the first microcontroller UC1.

E5: However, if a voltage is not in order or if a delivered current is insufficient, the first module 1 is switched to slave mode. The first microcontroller orders the second light D2 to switch off. The first module 1 is then configured to deliver the voltages 24 V L and 3.3 V L.

E6: The first microcontroller UC1 informs the second microcontroller UC2 that the second module 2 must be configured to operate in master mode. The second microcontroller UC2 orders the second module 2 to switch to master mode and the second light D20 to switch on. The second module 2 is then configured to deliver the voltages 24 V H and 3.3 V H.

E40: As in the first module, the second microcontroller UC2 is arranged to cyclically start up its test module to test the voltages that the second module 2 can deliver. The test consists in comparing the two voltages 24 V and 3.3 V with respect to the two upper and lower threshold values defined above.

If the measured voltages are not acceptable, the second module 2 remains in slave mode and the second microcontroller UC2 orders the third light D30 to switch off, indicating that the second module is not able to provide redundancy (E80).

E50: However, if the measured voltages are indeed within the predefined limits, the two microcontrollers UC1, UC2 are arranged to decide whether or not to implement a test of the second module 2, configured to operate in slave mode. This test is for example carried out cyclically.

If the test is not required, the second module 2 remains in slave mode (step E20).

E60: If the test is required, the first microcontroller UC1 starts up a control module in order to order the first module 1 to temporarily switch to slave mode and the second microcontroller UC2 starts up a control module in order to order the second module 2 to temporarily switch to master mode.

E70: The second microcontroller UC2 starts up its test module in order to measure the currents that the second module 2 is capable of delivering when the voltages are at 3.3 V and at 24 V. The test consists in comparing the measured current with a current value delivered by the first module when the latter is in master mode. The latter current value has for example been memorized beforehand by the first module 1 and sent to the second module 2 when the test is ordered.

If the test returns a positive result, then the second module 2 returns to slave mode and the first module 1 returns to master mode (thus returning to steps E2 and E20).

E80: If the test returns at least one negative result, this means that the second module 2 is faulty and that it is not capable of providing redundancy. The first microcontroller UC1 orders the first module 1 to switch to master mode and the second microcontroller UC2 orders the second module 2 to switch to slave mode. The second microcontroller UC2 orders the third light D13 to switch off, indicating that the second module 2 is not able to provide redundancy.

According to the invention, the two microcontrollers UC1, UC2 exchange messages through the bus. The system of the invention envisages that if the module configured to operate in master mode does not respond to the slave module after a predetermined duration, the slave module automatically switches to master mode.

According to the invention, when an electrical power supply module, which is then configured to operate in master mode, is faulty, the other electrical power supply module takes over and is configured to switch from slave mode to master mode. The faulty module is replaced by a new module which is then configured to operate in slave mode. Even if it replaces a module that was initially in master mode, the new module is not configured to operate in master mode, but in slave mode.

The solution of the invention therefore presents numerous advantages, among which:
- cyclically testing the slave module makes it possible to guarantee an electrical power supply, even in the event of failure of the master module;
- forcing the master module to age and preserving the slave module;
- signalling the failure of a module.

The invention claimed is:

1. An electrical power supply system for a programmable logic controller, the electrical power supply system comprising:
- a first electrical power supply module configured to operate in a master mode to deliver at least one electrical supply voltage to the programmable logic controller;
- a second electrical power supply module configured to operate in a slave mode to deliver the electrical supply voltage to the programmable logic controller in event of failure of the first electrical power supply module; and
- a first microcontroller and a second microcontroller each including:
  - a control module configured to temporarily control switching of the first electrical power supply module to the slave mode and switching of the second electrical power supply module to the master mode, and
  - a test module configured to test the second electrical power supply module in current when the second electrical power supply module is switched to the master mode, the test module being configured to measure electric current delivered by the second electrical power supply module when the second electrical power supply module is in the master mode, wherein the first and second microcontrollers communicate to implement the test by the respective test modules, and wherein each control module is configured to, after the test is completed and the electric current delivered by the second electrical power supply module when the second electrical power supply module is in the master mode is measured, control switching of the first electrical power supply module back to the master mode and switching of the second electrical power supply module back to the slave mode.

2. The electrical power supply system according to claim 1, wherein the test module
is configured to compare, before the control module controls the switching of the first electrical power supply module back to the master mode and switching of the second electrical power supply module back to the slave mode, the measured electric current with a minimum threshold value required to supply power to the programmable logic controller.

3. The electrical power supply system according to claim 1, wherein the test module is incorporated within the second electrical power supply module.

4. The electrical power supply system according to claim 3, wherein the test module is started up cyclically by the second electrical power supply module.

5. The electrical power supply system according to claim 3, wherein the test module of the second electrical power supply module is configured to measure, before the control module controls the switching of the first electrical power supply module back to the master mode and switching of the second electrical power supply module back to the slave mode, voltage delivered by the second electrical power supply module and compare the measured voltage with at least one threshold value.

6. The electrical power supply system according to claim 5, wherein the threshold value is determined according to whether the second electrical power supply module is in the master or slave operating mode.

7. The electrical power supply system according to claim 1, wherein the first electrical power supply module includes a test module, which is configured to measure, before the control module controls the switching of the first electrical power supply module back to the master mode and switching of the second electrical power supply module back to the slave mode, voltage delivered by the first electrical power supply module and compare the measured voltage with at least one threshold value.

8. The electrical power supply system according to claim 7, wherein the threshold value is determined according to whether the first electrical power supply module is in the master or slave operating mode.

9. An electrical power supply system for a programmable logic controller, the electrical power supply system comprising:
a first electrical power supply module configured to operate in a master mode to deliver at least one electrical supply voltage to the programmable logic controller;
a second electrical power supply module configured to operate in a slave mode to deliver the electrical supply voltage to the programmable logic controller in event of failure of the first electrical power supply module; and
a first microcontroller and a second microcontroller each including circuitry configured to
temporarily control switching of the first electrical power supply module to the slave mode and switching of the second electrical power supply module to the master mode, and
test the second electrical power supply module in current when the second electrical power supply module is switched to the master mode, the test including measuring electric current delivered by the second electrical power supply module when the second electrical power supply module is in the master mode,
wherein the first and second microcontrollers communicate to implement the test by the respective test modules, and
wherein after the test is completed and the electric current delivered by the second electrical power supply module when the second electrical power supply module is in the master mode is measured, each circuitry is further configured to control switching of the first electrical power supply module back to the master mode and switching of the second electrical power supply module back to the slave mode.

10. The electrical power supply system according to claim 9, wherein the test includes comparing
the measured electric current with a minimum threshold value required to supply power to the programmable logic controller.

* * * * *